Dec. 9, 1952     O. W. OERMAN     2,620,718
ADJUSTABLE HITCH FOR TWO-WAY PLOWS OR THE LIKE
Original Filed Aug. 2, 1944     2 SHEETS—SHEET 1
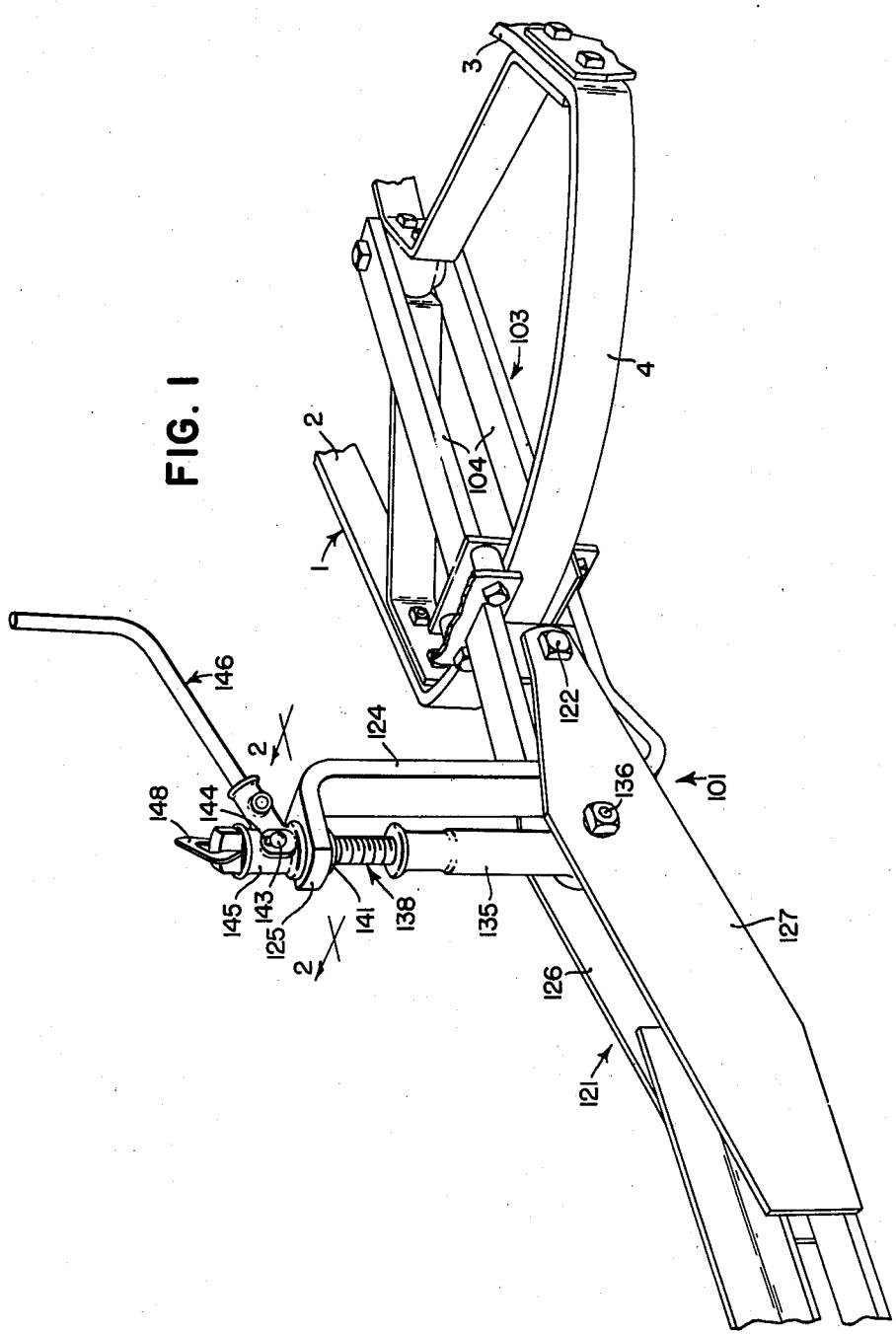
INVENTOR.
OREY W. OERMAN
BY
ATTORNEYS

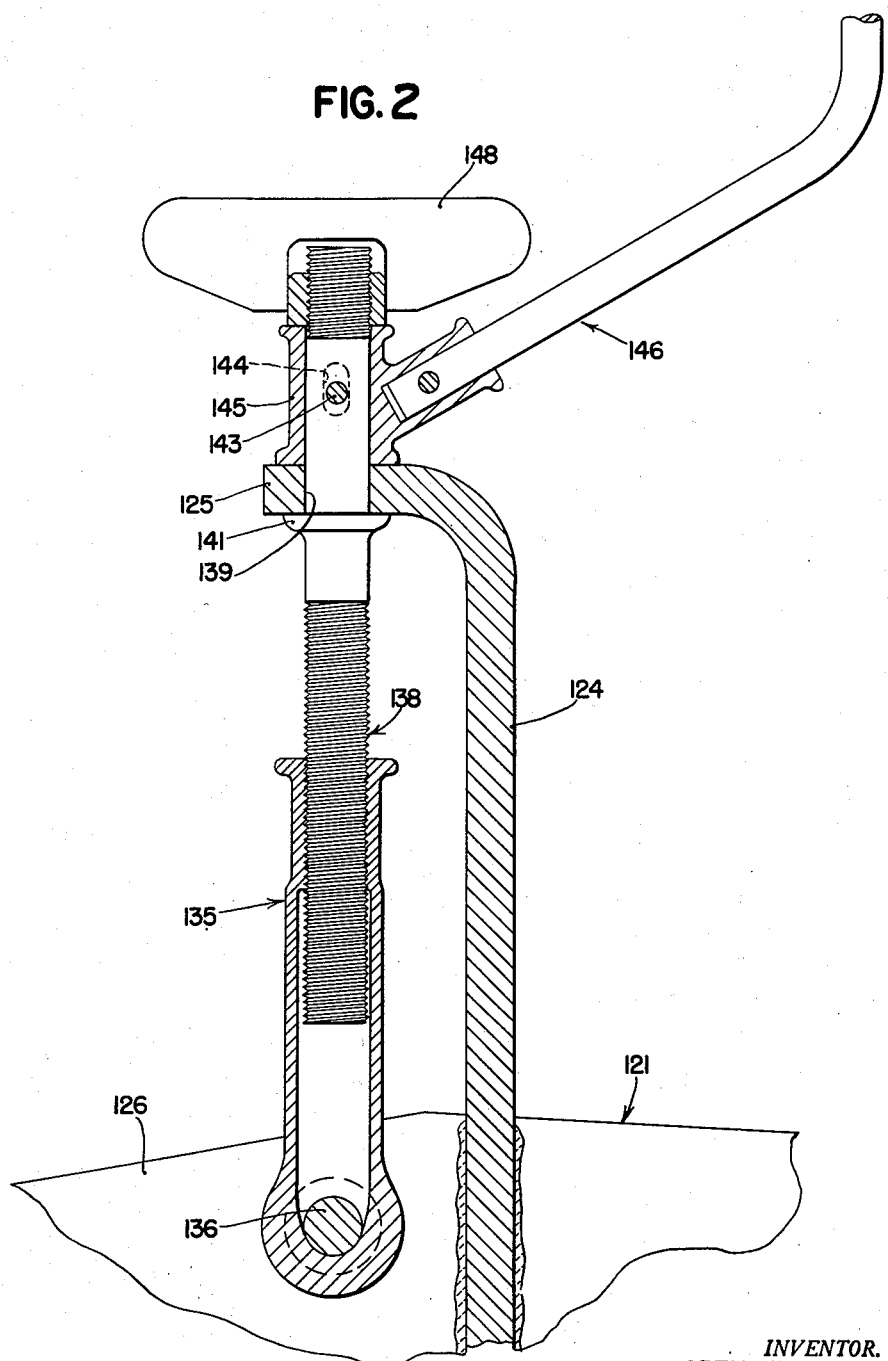

Patented Dec. 9, 1952

2,620,718

UNITED STATES PATENT OFFICE 2,620,718

ADJUSTABLE HITCH FOR TWO-WAY PLOWS OR THE LIKE

Orey W. Oerman, Moline, Ill., assignor to Deere & Company, Moline, Ill., a corporation of Illinois Original application August 2, 1944, Serial No. 547,784. Divided and this application February 27, 1950, Serial No. 146,515

4 Claims. (Cl. 97—240)

This application is a division of my co-pending application, Serial No. 547,784, filed August 2, 1944, now U. S. Patent 2,575,527, issued November 20, 1951.

The present invention relates generally to agricultural implements and more particularly to two-way plows which are especially adapted for use where it is desired to throw all of the furrows in the same direction.

The object and general nature of the present invention is the provision of a two-way plow, preferably of the two-bottom type in which the two plowing units are arranged in side-by-side relation, in which new and improved hitch mechanism is provided. More specifically, it is a feature of this invention to provide a hitch member having a generally vertically adjustable portion, with new and improved means for locking the vertically adjustable portion of the hitch against vertical displacement.

These and other objects and advantages of the present invention will be apparent to those skilled in the art after a consideration of the following detailed description, taken in conjunction with the accompanying drawings in which the preferred form of the invention has been illustrated.

In the accompanying drawings:

Figure 1 is a perspective view of a portion of a two-way plow in which the principles of the present invention have been incorporated.

Figure 2 is an enlarged sectional view taken generally along the line 2—2 of Figure 1.

Referring now more particularly to Figure 1, the reference numeral 1 indicates in its entirety the frame of a two-way plow in which the adjustable hitch of the present invention has been incorporated. The frame 1 includes generally longitudinally extending frame bars 2 and 3 connected together at their forward ends by a curved or arcuate section 4. Swingable from side to side of the frame 1, generally along the arcuate section 4, is a hitch unit 101 that comprises a laterally swingable member 103, preferably made up of a pair of vertically spaced bars 104, pivoted at its rear end to a generally central portion of the frame 1. The bars 104 are disposed so as to lie on opposite sides of the arcuate frame section 4. The forward portion of the hitch unit 101 is formed with a section 121 that is pivoted, as at 122, to the member 103. The forward end of the latter includes a vertical support 124 which has its upper end turned forward, as at 125. The member 121, or forward section of the hitch, includes a pair of vertical side plates 126 and 127 which at their forward ends are connected to a tractor or other propelling means.

A vertical tubular section 135 is swiveled, as at 136, to the laterally spaced plates 126 and 127 and at its upper end is interiorly threaded to receive the lower end of a threaded crank screw adjusting rod 138. The latter extends upwardly through an opening in the support 124. A collar forming a shoulder 141 is fixed to the adjusting rod 138, and above the support 124 the crank screw adjusting rod 138 is provided with an opening through which a bolt 143 extends. The bolt is disposed in a pair of slots 144 formed in the hub section 145 of a crank 146 that is in this manner connected non-rotatably to the rod 138. By virtue of the slots 144, the hub section 145 has limited vertical movement with respect to the rod 138, but whenever the crank 146 is rotated the rod 138 is likewise rotated in the tubular threaded member 135. Therefore, turning the crank 146 will raise or lower the front end of the hitch section 121 relative to the rear section 103.

The uppermost threaded end of the rod 138 is provided with a wing nut 148 which when tightened serves to clamp the hub section 145 down against the support 124, drawing the collar 141 firmly up against the underside of the support section 125. Thus, when the proper adjustment of the front end of the hitch has been effected by turning the crank 146, tightening the wing nut 148 serves to maintain the crank 146 in position and prevent displacement thereof. This clamping of the crank against the support has in addition another important function, namely, to positively clamp or lock the vertically pivoted hitch section 121 against vertical displacement with respect to the other member 103 that forms a part of the hitch 101. The latter, therefore, is a rigid part, rigidly connected with the frame 1 of the plow.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A hitch member for agricultural implements and the like, comprising a pair of relatively movable parts, a bracket fixed to one part, a member rotatably connected with the bracket and having a screw-threaded connection with the other of said pairs of parts, a crank member slidably but non-rotatably mounted on said rotatable member for rotating it to adjust said parts, and clamping means for shifting said crank member on said rotatable member into engagement with said bracket for holding said crank member and said rotatable member against rotation.

2. A hitch member for agricultural implements and the like, comprising a pair of relatively movable parts, a bracket fixed to one part, a member rotatably connected with the bracket and having a screw-threaded connection with the other of said pair of parts, a shoulder on said rotatable member at one side of said bracket, a crank member slidably but non-rotatably mounted on said rotatable member at the other side of said bracket for rotating said member so as to adjust said parts, and means on said rotatable member and acting thereagainst for forcing said crank member against said bracket and clamping the latter between said shoulder and said crank member.

3. An agricultural implement comprising a part to be adjusted, a support with respect to which said part is adjustable, a rod mounted for rotation with respect to said support and having a screw-threaded end, a member having a screw-threaded connection with said end of said rod and connected with said implement part to be adjusted, means carried by said rod for preventing axial displacement of said rod with respect to said support, whereby rotation of said rod serves to adjust said implement part, a crank having a loose connection with said rod accommodating axial movement of the latter with respect to said crank for preventing rotation of said rod with respect to said crank, whereby rotation of the latter serves to rotate said rod, and clamping means for clamping said crank and rod firmly to said support for holding the rod in any position of adjustment.

4. In combination, a support, a rod-like member mounted for rotation in said support, a collar fixed to said rod member at one side of said support, a crank having a hub section disposed about said rod at the other side of said support, means connecting said hub section with said rod for accommodating a limited amount of axial movement of said hub with respect to said rod but preventing relative rotation therebetween, whereby turning said crank will rotate said rod, and a clamping member having a screw-threaded connection with the rod adjacent said hub whereby, after said crank has rotated the rod into the desired position of adjustment with respect to said support, tightening said clamping member on said rod will clamp the hub and said collar firmly against said support so as to prevent rotation of said rod and said crank.

OREY W. OERMAN.

REFERENCES CITED

The following references are of record in the file of this patent:

UNITED STATES PATENTS

| Number | Name | Date |
|---|---|---|
| 302,703 | Booth | July 29, 1884 |
| 412,846 | Glendinning et al. | Oct. 15, 1889 |
| 1,493,970 | Dubois | May 13, 1924 |
| 2,328,343 | Jacob | Aug. 31, 1943 |